US008868744B2

(12) United States Patent
Levell et al.

(10) Patent No.: US 8,868,744 B2
(45) Date of Patent: Oct. 21, 2014

(54) TRANSACTIONAL MESSAGING SUPPORT IN CONNECTED MESSAGING NETWORKS

(75) Inventors: Jonathan Levell, Winchester (GB); Matthew David Peel, London (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/281,542

(22) Filed: Oct. 26, 2011

(65) Prior Publication Data

US 2012/0131115 A1   May 24, 2012

(30) Foreign Application Priority Data

Nov. 24, 2010   (EP) .................................. 10192442

(51) Int. Cl.
*G06F 15/173*   (2006.01)
*G06F 9/54*   (2006.01)
*G06F 9/46*   (2006.01)

(52) U.S. Cl.
CPC ............... *G06F 9/466* (2013.01); *G06F 9/546* (2013.01); *G06F 9/542* (2013.01); *G06F 9/541* (2013.01)
USPC .......................................... 709/225; 709/206

(58) Field of Classification Search
CPC ....................................................... G06F 15/16
USPC ................................................ 709/206, 225
See application file for complete search history.

(56) References Cited

U.S. PATENT DOCUMENTS

2005/0132060 A1* 6/2005 Mo et al. ........................ 709/227
2005/0267897 A1* 12/2005 D'Costa et al. ............... 707/100
2006/0133412 A1 6/2006 Callaghan
2006/0265448 A1 11/2006 Qing et al.
2007/0291653 A1* 12/2007 Smith et al. .................... 370/252
2008/0051119 A1 2/2008 Bouckaert et al.
2010/0159887 A1* 6/2010 Lewis ........................ 455/412.2

OTHER PUBLICATIONS

The Open Group; Distributed Transaction Processing: Reference Model, Version 3, Open Company Ltd., U.K.; Feb. 1996.
Raj; Guarantee Inter-Enterprise Message Delivery Using JMS, Java Report, Aug. 2000.
Trythall; JMS and CORBA Notification Interworking; http://www.onjava.com/pub/a/onjava/2001/12/12/jms_not.html; Dec. 12, 2001.
International Search Report and Written Opinion PCT application PCT/EP2011/070361, Mar. 20, 2012.
German Office Action Jul. 12, 2013.
Purdue University PowerPoint Presentation, CH 17—Introduction to Transactional Processing Concepts and Theory, taken from Elmasari, Ramez A. and Navathe, Shamkan B., Fundamentals of Database Systems, 5th ed, Addison Wesley Mar. 17, 2006.

* cited by examiner

*Primary Examiner* — David Lazaro
*Assistant Examiner* — Marie Georges Henry
(74) *Attorney, Agent, or Firm* — Grasso PLLC; Fred Grasso

(57) ABSTRACT

A method and system are provided for transactional messaging support in connected messaging networks. A first messaging network is provided which does not support transactional processing and a second messaging network is provided which does support transactional processing. A proxy application is provided between the first and second messaging networks. The proxy application receives messages from a first application on the first messaging network, the messages including instructions regarding transactional processing of the messages, and forwards the messages to the second messaging network using a transactional processing supported by the second messaging network.

20 Claims, 5 Drawing Sheets

TRANSACTIONAL MESSAGING SUPPORT IN CONNECTED MESSAGING NETWORKS

BACKGROUND

The invention generally relates to the field of connected messaging networks. In particular, the invention relates to providing transactional messaging support in connected messaging networks.

Often networks of multiple types of message engines/clients are connected together. Different types of messaging networks may have different features. A first more feature-rich network may be connected to a second less sophisticated network. This means that an application connected to the less sophisticated network may not be able to access or use some of the functions of the more feature-rich network.

For example, using WebSphere Message Broker V6, MQTT (MQ Telemetry Transport) clients can be connected into an MQ network (WebSphere, MQTT and MQ are trade marks of International Business Machines Corporation). MQTT is a simple, lightweight protocol that can be used in devices such as mobile phones whereas MQ is a feature-rich protocol that requires more powerful computers to run on.

BRIEF SUMMARY

Sometimes, clients on one messaging network would like access to features of the other messaging network. For example, an MQTT application on a mobile phone might want to be able to put messages under syncpoint to the MQ network so that they can ensure that all the receivers of the message receive it or no receiver does.

Various methods may embody the invention. In embodiments, a method for transactional messaging support may be provided. These methods may involve connected messaging networks with a first messaging network that may not support transactional processing and a second messaging network which may support transactional processing. In these embodiments, the method may comprise providing a proxy application between the first and second messaging networks, wherein the proxy application: receives messages from a first application on the first messaging network, the messages including instructions regarding transactional processing of the messages; and forwards the messages to the second messaging network using a transaction processing supported by the second messaging network.

Various computer software products may embody the invention. These embodiments may include a computer software product for transactional messaging support in connected messaging networks. In these or other embodiments the computer product may include a computer-readable storage medium having computer readable program code embodied therewith, the computer readable program code configured to: receive messages from a first application on a first messaging network which does not support transactional processing, the messages including instructions regarding transactional processing of the messages; and forward the messages to a second messaging network using a transactional processing supported by the second messaging network.

Various systems may also embody the invention. These embodiments may include systems for transactional messaging support in connected messaging networks and may include a first messaging network which does not support transactional processing; a second messaging network which does support transactional processing; and a proxy application provided between the first and second messaging networks. In embodiments this proxy application may include an information reading component for receiving and reading messages from a first application on the first messaging network where the messages may include instructions regarding transactional processing of the messages and a transaction processing component that may forward the messages to the second messaging network using a transactional processing supported by the second messaging network.

BRIEF DESCRIPTION OF THE SEVERAL VIEWS OF THE DRAWINGS

The invention, as to organization, structure, and method of operation, together with objects, features, and potential advantages thereof, may best be understood by reference to the following detailed description when read with the accompanying drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A method and system are provided in which a proxy application on one messaging network performs transactional messaging on behalf of an application connected to a messaging network that does not support transactions. A beginning and an end of a batch of messages may be exposed in a proxy transaction so that the sending application may have control.

In so doing, embodiments may provide that applications connected to a messaging network that does not support transactions, to control which operations are parts of which transaction. The operations may be performed by the proxy application on a messaging network that supports transactions on behalf of the sending application. The proxy application on one messaging network may receive and act on requests from an application on the other messaging network and may provide responses to the original sender detailing the success (or otherwise) of the requests.

A proxy application may perform transactional messaging on behalf of an application connected to a network that does not support transactions giving the sending application control of which operations are performed as a transactional unit-of-work. In addition, the proxy application may perform one or more other functions as follows:

The proxy application may perform publish/subscribe operations on behalf of an application on a connected point-to-point only messaging network;

The proxy application may perform point-to-point messaging on behalf of an application on a publish/subscribe only messaging network;

The proxy application may assemble a single large message in response to a series of message fragments sent from an application connected to a more unreliable messaging network. These fragments should also be able to include metadata such as MQ's message properties;

The proxy application may send multicast messages on behalf of an application connected to a network that doesn't support multicast.

Figure 1:
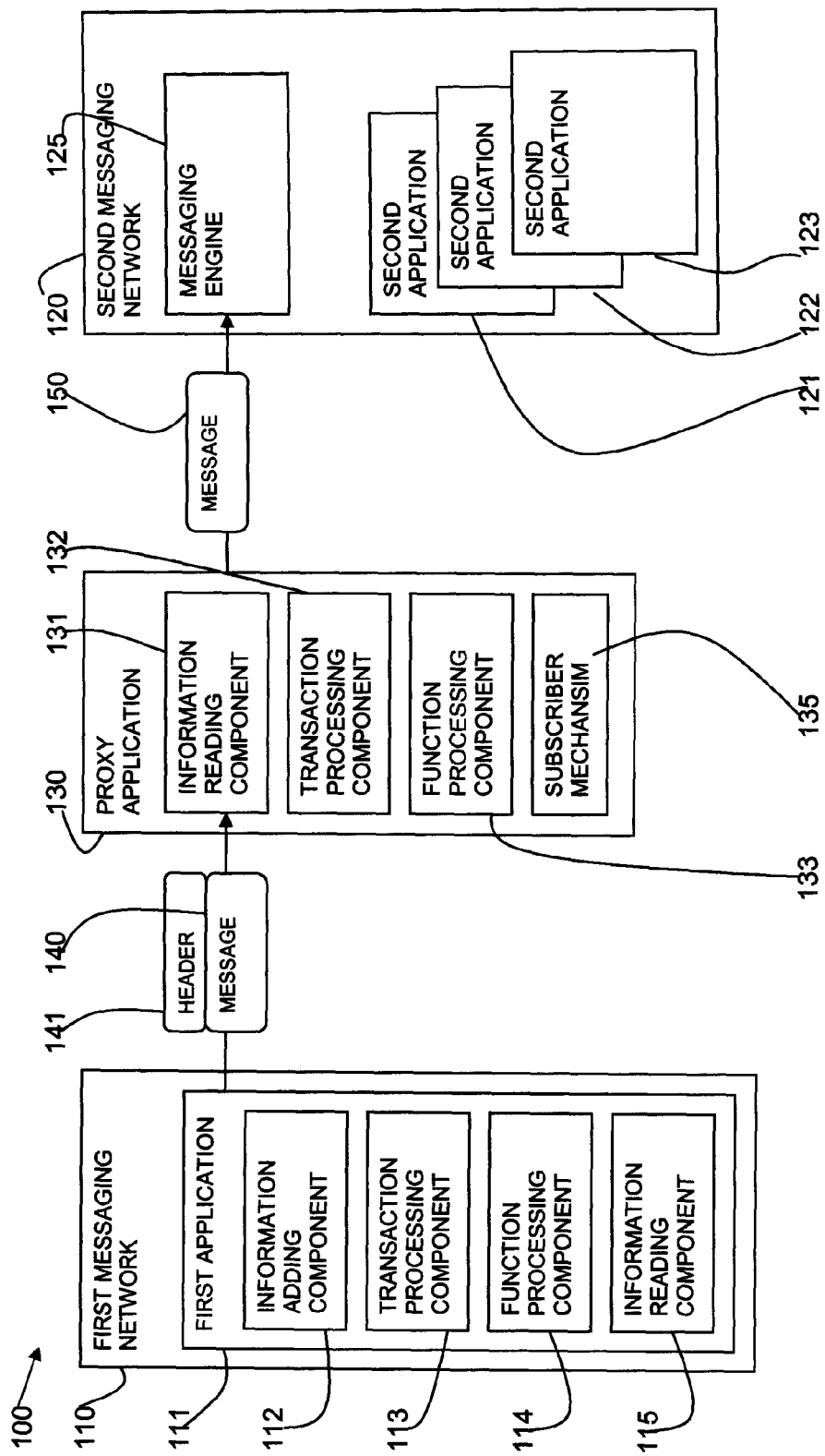
FIG. 1 is block diagram of a system in accordance with the present invention.

Referring to FIG. 1, a block diagram shows an embodiment of the described system 100. A first messaging network 110, which does not support transactional processing, is provided. A second messaging network 120, which does support transactional processing is also provided. The two messaging networks 110, 120 are connected, for example via a messaging broker.

In embodiments, a first application 111 on the first messaging network 110 may produce messages to be consumed by applications 121-123 on the second messaging network 120, via a messaging engine 125. A proxy application 130 may be provided to perform transactional messaging on behalf of the first application 111. This proxy may give the first application 111 control of which operations are performed as a transactional unit-of-work. The proxy application 130 may be a stand-alone application or may be built into a messaging engine in one of the messaging networks or the gateway between the messaging networks.

The first application 111 may include an information adding component 112 for adding information to a message to instruct the proxy application 130 how to handle transactions and any other functionality to be added by the proxy application 130. The first application 111 may also include a transactional processing component 113 for coordinating transactional processing to be instructed to the proxy application 130. The first application 111 may further include a function processing component 114 for coordinating additional functional processing to be instructed to the proxy application 130 and may also include an information reading component 115 to interpret return messages from the proxy application 130.

In embodiments, the information adding component 112 may add a header 141 to a message 140 to be sent by the first application 111. The header 141 may include a topic, a destination queue, and an identifier of a unit of work to which the message belongs.

In embodiments, the information adding component 112 adds information in the form of the topic of the message 140. In so doing, the first application 111 may request a commit of a unit of work as instructed to the proxy application 130. The first application 111 may also include an information reading component 115 for reading the information from incoming messages from the proxy application 130. Still further, in embodiments, the proxy application 130 may include a subscription mechanism 135 for subscribing to a topic on which the first application 111 publishes messages with the additional transactional processing information.

As can also be seen, the proxy application 130 may also include an information reading component 131 for reading the added information from the first application 111 relating to a message 140. And, in embodiments, this may read a header 141 of a message 140 received from the first application 111 while in further embodiments, this may read the topic of the message 140 to obtain instructions.

In embodiments, the proxy application 130 may include a transaction processing component 132 for adding the transaction processing to the message 150 as forwarded to a messaging engine 125 of the second messaging network 120 for access by the second applications 121-123 of the second messaging network 120. Also, the proxy application 130 may also include other function processing components 133 for adding other functionality to the message 150 in response to instruction received from the first application 111. For example, other functionality may include: converting between publish/subscribe messages and point to point messages and visa versa, compiling multiple small messages in to a large messages, and converting a message to a multicast message.

Responses to the first application 111 may be generated by the proxy application 130 based on the success/failure of operations the proxy application 130 carries out for the first application 111. Responses from a second application 121-123 may flow from the second messaging network 120 to first messaging network 110 without needing the proxy application 130. When a transaction is committed, the messages are normal messages and can therefore be processed by the first application 111.

Figure 2:
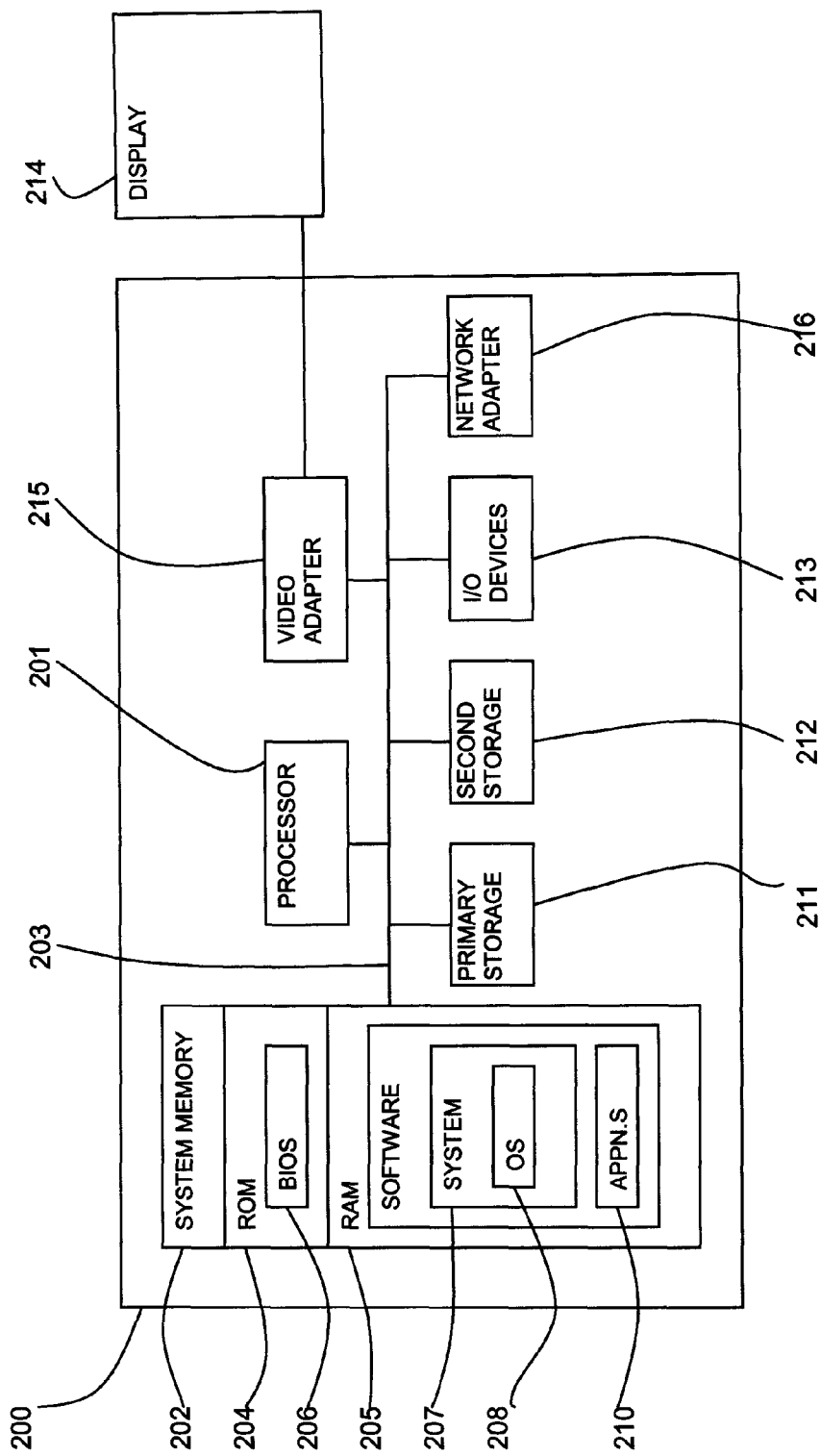
FIG. 2 is a block diagram of a computer system in which the present invention may be implemented.

Referring to FIG. 2, an exemplary system for implementing aspects of the invention is provided. These embodiments may include a data processing system 200 suitable for storing and/or executing program code including at least one processor 201 coupled directly or indirectly to memory elements through a bus system 203. The memory elements in embodiments can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Figure 3:
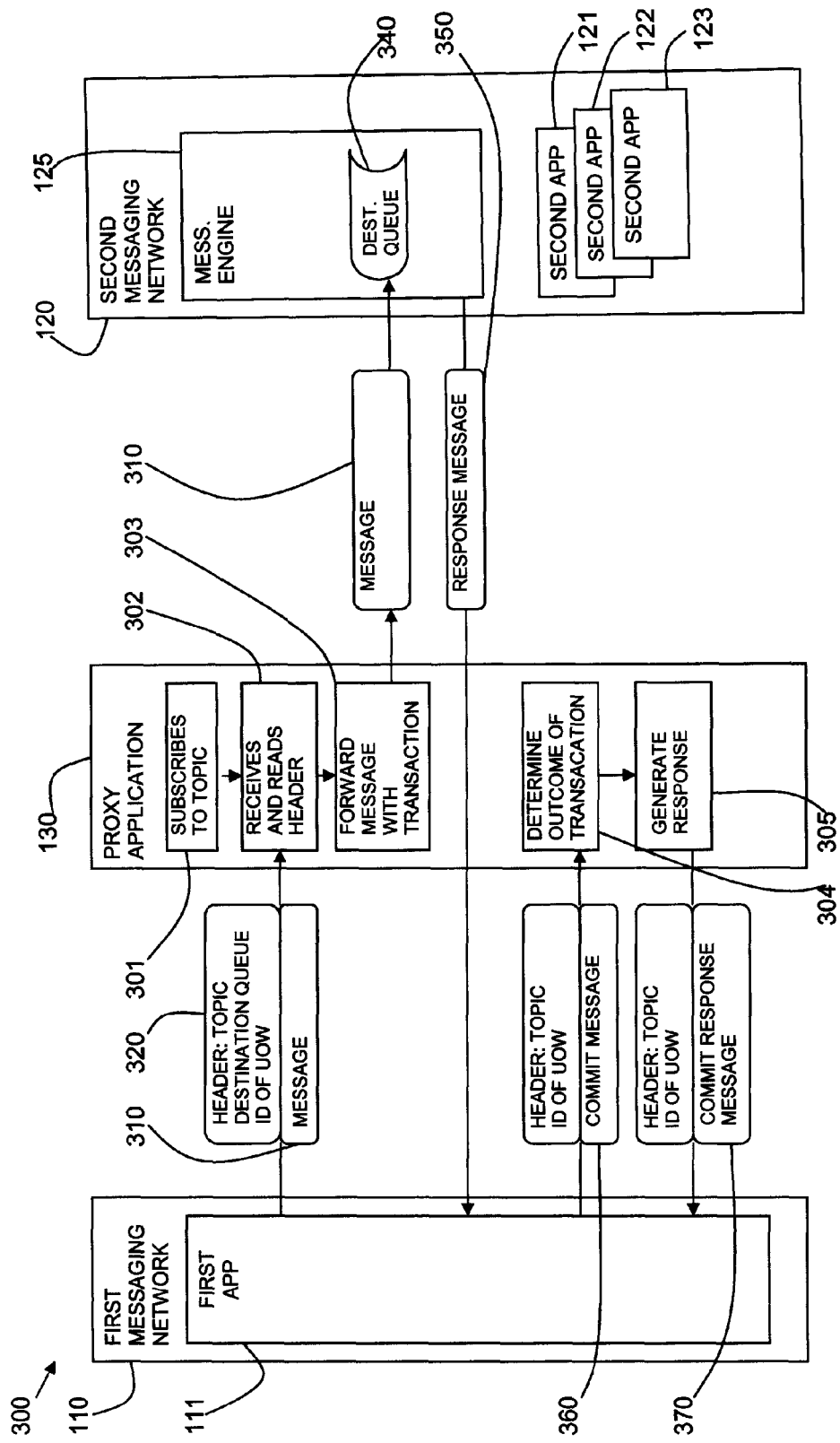
FIG. 3 is a schematic diagram showing the flow of messages in accordance with an embodiment of the present invention.

Referring to FIG. 3, a schematic diagram 300 shows an examplary embodiment of the message flow between a first application 111 on a first messaging network 110 which is a non-transactional processing network, and a messaging engine 125 on a second messaging network 120 which is transactional processing via a proxy application 130. As can be seen, in embodiments, the messaging engine 125 can include designation queues 340 from which one or more application 121-123 may read messages In transaction embodiments, either everything done in the transaction succeeds or the transaction is backed out and nothing that was part of the transaction occurred. The described method allow the first application 111 connected to the first messaging network 110 that does not support transactions to control which operations are parts of which transaction.

The operations may be performed by the proxy application 130 on behalf of the first application 111 on the second messaging network 120 that does support transactions. In embodiments, the proxy application 130 may expose the beginning and end of a batch of messages in a proxy transaction so that the first application 111 has control. The first application 111 may also publish one or more messages 310 containing a special header 320 including a topic that the proxy application 130 subscribes 301 to. The header 320 may include a destination queue and an identifier of a unit of work (UOW) that the message 310 is part of. The proxy application 130 may then receive the published message 310 and may read the header 320. The proxy application 130 may forward the message 310 with transactional processing according to the information from the header 320. The proxy application 130 can put the message 310 to the second messaging network 120 using whatever mechanism the second messaging network 120 uses to support transactions. The proxy application 130 can also put the message in a transaction to the destination queue 340 on the second messaging network 120.

Optionally, in embodiments, the proxy application 130 performs the put as the user of the first application 111 was authenticated as, if it has the required authority. Different users may have different authorities. If the first application 111 provides a username (and optionally some authentication information) the proxy application 130 can carry out the transaction as that user. For example, an application running as user "bob" sends a request to the proxy application 130 to publish to "/happy/christmas". The metadata might include a password. When the proxy application 130 publishes to the second messaging network 120, it authenticates as "bob" (and optionally supplies the password it was given). The success or failure will then depend on Bob's access—not that of another user.

In embodiments, the second application 121 sends a response message 350 which will flow from the second messaging network 120 to the first messaging network 110 without going via the proxy application 130. The first application 111 publishes a subsequent commit message 360 asking for the transaction to be committed or backed out. The proxy application 130 determines 304 success or failure of the messages it processed on behalf of the first application 111 in a transaction and generates 305 a commit response message 370 and sends this to the first application 111. Optionally, the proxy application 130 may have a time limit for commit or back out of the transaction.

Figure 4:
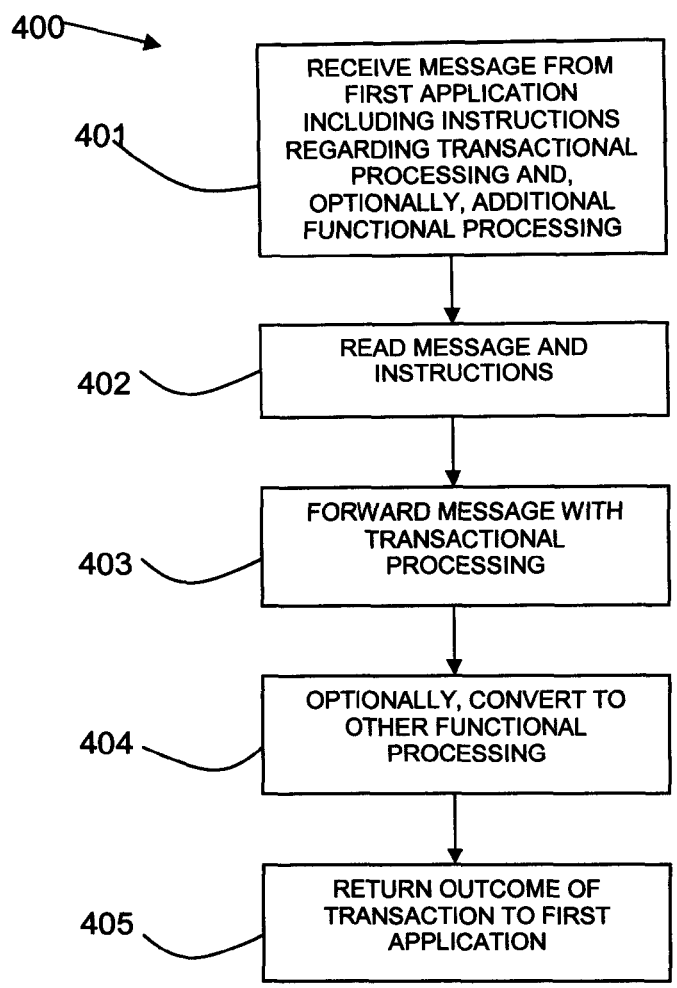
FIG. 4 is a flow diagram of a method in accordance with an embodiment of the present invention.

Referring to FIG. 4, a flow diagram 400 shows an embodiment of the described method as carried out by the proxy application. Here, in this embodiment, the proxy application receives 401 a message from a first or producing application on a first messaging network which does not support transactional processing. The message includes instructions from the first application regarding transactional processing of the message and, optionally, additional instructions regarding functional processing of the message. Additional functional processing may include converting between point-to-point and publish/subscribe messages, compiling multiple messages together, or converting to a multicast message.

The proxy application reads 402 the instructions provided in the message and forwards 403 the message with transactional processing supported by a second messaging network to which the message is to be sent. Optionally, the message is also converted 404 to add other functionality.

The proxy application returns 305 a message to the first application regarding the outcome of the message.

An example embodiment is provided between a first messaging network in the form of an MQTT network connected to an MQ network which supports a richer set of features including transactional processing. An MQ network is able to connect up to a network of intelligent but simple devices used for instrumenting pipelines, rail tracks, and other telemetry applications, which speak a much simpler MQTT protocol. An MQTT client may wish to (for example) put messages under syncpoint, add message properties to a message, and/or broadcast a message via multicast.

In this example, if the proxy application is an MQ application, the MQTT client would need to route requests to the proxy application. If the proxy was part of the messaging network at the gateway between the two networks then the MQTT application could send messages directly to their final destination with the proxy application intercepting and acting on them.

Figure 5:
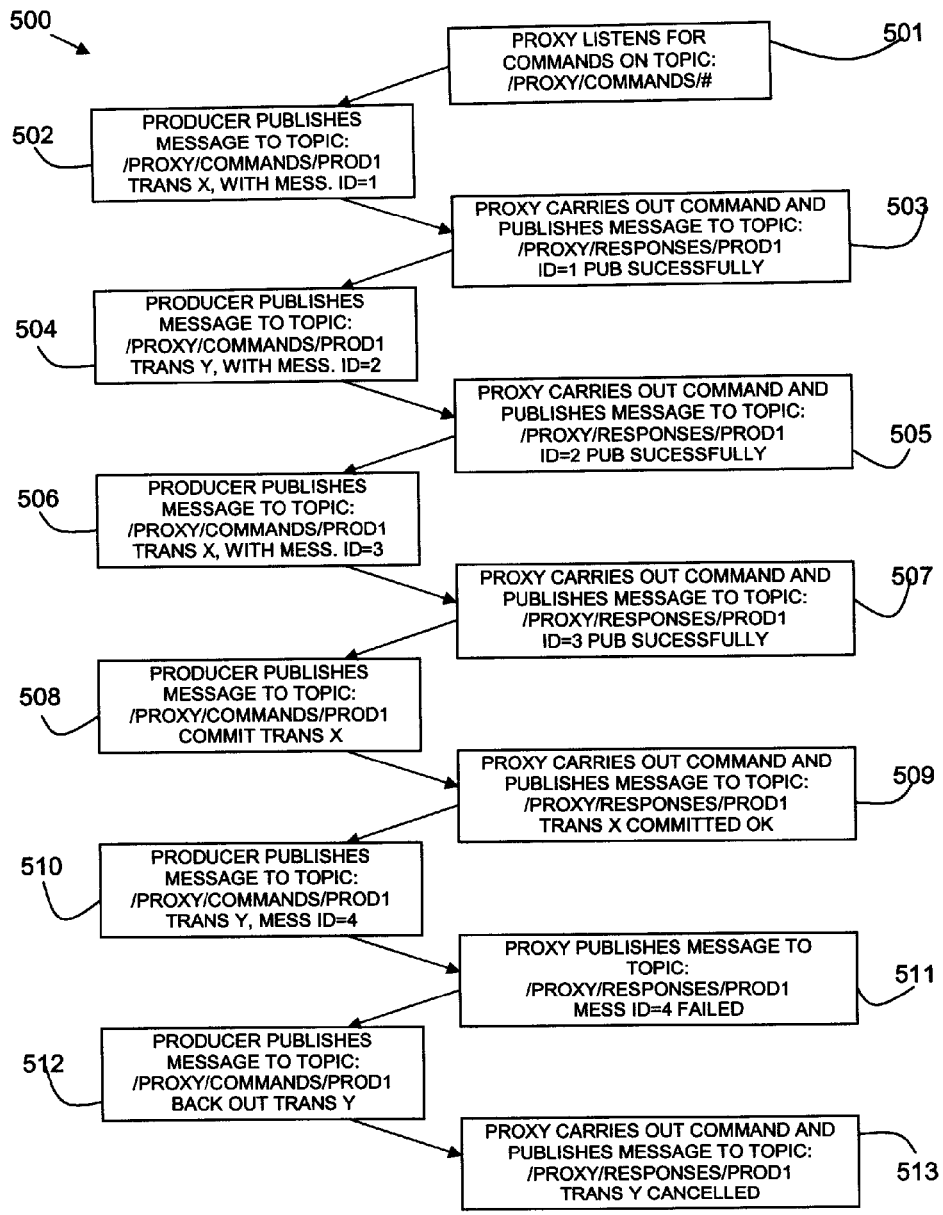
FIG. 5 is a flow diagram showing the flow of messages in accordance with an embodiment of the present invention.

Referring to FIG. 5, a flow diagram 500 shows an example flow between a producing application and a proxy application. The producing application is on a messaging network which only supports publish/subscribe messaging and does not support transactional processing. The proxy application is on a connected messaging network that supports transactional publish/subscribe messaging and point-to-point messaging. The proxy application listens 501 for commands published on the topic string: /proxy/commands/ #. The producer application needs to give the proxy application instructions about what to do with messages it is sending it. This can be achieved either by altering the topic-string it is using or by including the information as a header in the message.

The producer publishes 502 a message on /proxy/commands/producer1:

"Start a new transaction called X and as part of the transaction put a message (with message id=1 that says "Hello" to queue "destinationqueue"".

The proxy does this and publishes 503 a message on /proxy/responses/producer1 saying message id=1 put successfully.

The producer publishes 504 a message on /proxy/commands/producer1:

"Start a new transaction called Y and as part of the transaction put a message (with message id=2 that says "Hello" to queue "destinationqueue2"".

The proxy does this and publishes 505 a message on /proxy/responses/producer1 saying message id=2 put successfully. The producer publishes 506 a message on /proxy/commands/producer1:

"As part of transaction X publish a message (with message id=3) that says "Hello" to topic /happy/Christmas".

The proxy does this and publishes 507 a message on /proxy/responses/producer1 saying message id=3 published successfully.

The producer publishes 508 a message on /proxy/commands/producer1:

"Commit the transaction X".

The proxy replies 509 "transaction X committed ok".

The producer publishes 510 a message on /proxy/commands/producer1:

"As part of transaction Y publish a message (with message id=4) that says "Hello" to topic /happy/christmas/secret".

The proxy replies 511 "put of message 4 failed with error: SECURITY_ERROR_PUBLISH_NOT_ALLOWED.

The producer publishes 512 a message on /proxy/commands/producer1:

"Back out transaction Y".

The proxy replies 513 that transaction Y has been cancelled

So although the producer wanted to send four messages, when one of the message failed, the producer could decide to back out that whole transaction so only two messages (with ids 1 and 3) were actually sent.

Additional functionality can also be added by the proxy application on behalf of the first messaging system when communicating with a second more sophisticated messaging network. For example, the proxy application may perform publish/subscribe operations on behalf of an application on a connected point-to-point only messaging network, as follows:

Proxy application listens for commands on queue "Q1";

Producer application puts message to "Q1" on with a topic string included in the header;

Proxy application publishes the message to the topic listed in the header via the second messaging network;

Proxy application sends a reply message to a queue which the producer application listens on, reporting if the publish succeeded or not.

The proxy application may also perform point-to-point messaging on behalf of an application on a publish/subscribe only messaging network, as follows.

Proxy application listens for commands on topic: /PROXY/COMMANDS/#

Producer application publishes to topic: /PROXY/COMMANDS/# and included in the message header is the name of a queue on the second messaging network to put the message to and instructions to do a put;

Proxy application puts the message to the relevant queue;

Proxy application publishes a reply message to a topic which the producer application listens on, reporting if the put succeeded or not.

The proxy application may assemble a single large message in response to a series of message fragments sent from an application connected to a more unreliable messaging network. These fragments should also be able to include metadata such as message properties.

Proxy application listens for commands on queue Q1;

Producer application puts a message to Q1 on the proxy and included in the message header are a sequence number and a flag to say that this is the first message in a sequence;

Producer application then puts each subsequent message to the proxy application with sequentially increasing sequence numbers, until the last message is sent, which also includes a flag in the header to say it is the last message;

Proxy application waits until the last message has been received and checks that there are no sequence numbers missing and then assembles the bodies and metadata of all the messages into one large message, which it then sends to the second messaging network;

Proxy application sends a reply message to a queue which the producer application listens on, reporting if the put succeeded or not.

The proxy application may also send multicast messages on behalf of an application connected to a network that does not support multicast.

Proxy application listens for commands on queue Q1;

Producer application puts a message to Q1 on the proxy application and included in the message header is a flag to instruct the proxy application that this is a multicast message along with any extra information required for the multicast;

The proxy application then publishes the message as a multicast message via the second messaging network;

Proxy application sends a reply message to a queue which the producer application listens on, reporting if the put succeeded or not.

A simple messaging network can be connected to a more complex, featureful network and clients connected to the simple network can send and receive messages which look like normal simple messages but have instructions encoded into the message to be interpreted by a proxy application and forwarded by the proxy application to the more featureful network.

The messages from the client, which include control instructions, may flow through a number of messaging engines that do not understand the instructions before arriving at the proxy that can decode or interpret the instructions and use the advanced features on behalf of the client. A transactional messaging support system may be provided as a service to a client over a network.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A computer program comprising computer program code stored on a non-transitory computer readable medium, which when loaded into a computer system and executed thereon, causes said computer system to perform steps comprising:

providing a proxy application between or within a first messaging network and a second messaging network, the first messaging network having a first application for producing an original message and the second messaging network having a second application for producing a response message to the original message from the first application, the first messaging network supporting non-transactional processing and the second messaging network supporting transactional processing, wherein the proxy application:

receives original messages from the first application on the first messaging network, the messages including instructions regarding transactional processing of the original messages;

creates a proxy transaction according to the instructions; and forwards the proxy transaction to the second messaging network using a procedure of transactional processing supported by the second messaging network and different than the non-transactional processing of the original messages supported by the first messaging network, wherein if at least a portion of the proxy transaction fails at the second messaging network, the proxy transaction is backed out such that no part of the proxy transaction occurred at the second messaging network.

2. The computer program code stored on a non-transitory computer readable medium of claim 1 that causes said computer system to perform further steps comprising:

having the proxy application expose a beginning and an end of batch messages in a proxy transaction so that the first application has control.

3. The computer program code stored on a non-transitory computer readable medium of claim 1 that causes said computer system to perform further steps comprising:

allowing the first application to control which received messages from the first application are part of a first proxy transaction of several messages or part of a second proxy transaction of several messages.

4. The computer program code stored on a non-transitory computer readable medium of claim 1 that causes said computer system to perform further steps comprising:

receiving from the first application
a header including a destination for one or more messages from the first application and
an identifier for determining which proxy transaction the one or more messages are a part of.

5. The computer program code stored on a non-transitory computer readable medium of claim 1 that causes said computer system to perform further steps comprising:

determines the success or failure of a previous proxy transaction processed on behalf of the first application and generates a commit response; and sends the generated commit response message to the first application.

6. The computer program code stored on a non-transitory computer readable medium of claim 1 that causes said computer system to perform further steps comprising:

receiving an instruction from the first application to back out a proxy transaction previously created from messages from the first application.

7. A system for transactional messaging support in connected messaging networks, comprising:

a first messaging network which does not support transactional processing;

a second messaging network which does support transactional processing;

a proxy application provided between the first and second messaging networks, or within the first messaging network, wherein the proxy application includes:

an information reading component for receiving and reading messages from a first application on the first messaging network; and a transaction processing component for forwarding the messages as a proxy transaction to the second messaging network using a transactional processing procedure supported by the second messaging network, wherein an application at the second messaging network generates responsive messages to the messages from the first application on the first messaging network, and wherein transactional processing is considered supported by a messaging network when everything done in a certain transaction succeeds or the transaction is backed out and nothing that was part of the transaction occurred.

8. The system as claimed in claim 7, wherein the proxy application includes:

a function processing component for converting messages to include additional functionality supported by the second messaging network.

9. The system as claimed in claim 8, wherein the additional functionality includes:

converting a publish/subscribe message to a point to point message.

10. The system as claimed in claim 8, wherein the additional functionality includes:

converting a point to point message to a publish/subscribe message.

11. The system as claimed in claim 8, wherein the additional functionality includes:

converting multiple short messages to a single long message.

12. The system as claimed in claim 8, wherein the additional functionality includes:

converting a message to a multicast message.

13. The system of claim 7 wherein the instructions regarding transactional processing of the messages includes exposing a beginning and an end of the proxy transaction of messages so that the first application has control.

14. The system of claim 7 wherein the instructions are provided in a header of a message sent or received by the first application.

15. The system of claim 7 wherein the instructions are provided in the topic of a message sent or received by the first application.

16. The system of claim 7, wherein the proxy application subscribes to messages on a topic on which commands from the first application are published.

17. The system of claim 7, wherein the first messaging network is a network applying telemetry defined under the Telemetry Transport Lightweight Protocol and is connected to the second messaging network via a messaging broker.

18. The system of claim 7, wherein the proxy application is a stand-alone application.

19. The system of claim 7, wherein the proxy application is built into one of the first or second messaging networks.

20. The system of claim 7, wherein the proxy application is built into a gateway between the first and second messaging networks.

* * * * *